United States Patent Office 2,784,223
Patented Mar. 5, 1957

2,784,223

N,N'-DICARBOXYMETHYL THIURAM DISULFIDES

Mario Scalera, Somerville, and John F. Hosler, Bound Brook, N. J., assignors to American Cyanamid Company, New York, N. Y., a corporation of Maine No Drawing. Application July 21, 1954,
Serial No. 444,925

6 Claims. (Cl. 260—534)

The present invention relates to new and useful N,N'-dicarboxymethyl thiuram disulfide compounds which correspond to the formula

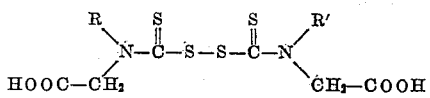

wherein R and R' are acyclic hydrocarbon radicals containing from one to four carbon atoms such as methyl, ethyl, propyl, isopropyl, allyl, butyl, isobutyl and tert-butyl. Typical illustrative compounds include, for example:

N,N'-dimethyl-N,N'-dicarboxymethyl thiuram disulfide
N,N,'-diethyl-N,N'-dicarboxymethyl thiuram disulfide
N,N'-dipropyl-NN'-dicarboxymethyl thiuram disulfide
N,N'-diallyl-N,N'-dicarboxymethyl thiuram disulfide
N,N'-dibutyl-N,N'-dicarboxymethyl thiuram disulfide
N,N'-di-tert-butyl-N,N'-dicarboxymethyl thiuram disulfide
N-methyl-N'-ethyl-N,N'-dicarboyxmethyl thiuram disulfide
N-methyl-N'-isopropyl-N,N'-dicarboxymethyl thiuram disulfide
N-ethyl-N'-tert-butyl-N,N'-dicarboxymethyl thiuram disulfide
N-methyl-N'-allyl-N,N'-dicarboxymethyl thiuram disulfide
N-butyl-N'-allyl-N,N'-dicarboxymethyl thiuram disulfide The compounds of this invention are readily prepared by reacting N-substituted derivatives of glycine in an aqueous alkaline solution with carbon disulfide at a temperature of from about 0° to 20° C. The resulting dithiocarbamic acid derivative is then oxidized to the thiuram disulfide with a suitable oxidant such as nitrous acid, iodine or ammonium persulfate. The unsymmetrically substituted dicarboxymethyl thiuram disulfides, such as the N-methyl-N'-ethyl-N,N'-dicarboxymethyl derivative, are prepared by performing the oxidation on a mixture of two different substituted dithiocarbamic acids. The unsymmetrical compound is then obtained as a mixture with some of the two corresponding symmetrically substituted derivatives. The N-substituted derivatives of glycine which are employed in the process include N-methylglycine, N-ethylglycine, N-allylglycine, N-isopropylglycine, N-butylglycine, and the like.

The compounds of the present invention are highly effective in preventing and retarding fungus growth on seeds, soils, plants, fruit, wood, fur, wool, cotton, leather, and other organic matter. They may be used either as the free acid or as salts such as the sodium, potassium, ammonium, substituted ammonium, calcium, zinc and copper salts. The water-soluble characteristics of the sodium, potassium and ammonium salts are especially advantageous because of increased ease of application over many known materials used as fungicides.

In controlling the growth of fungi, these compounds may be applied as dry powders usually in mixture with inert carriers such as talc, bentonite pumice, Fuller's earth and the like. They may also be applied in the form of a spray solution or suspension in a liquid carrier. When the free acids or water-soluble salts are employed and the liquid carrier is water, it is an advantage to use in the composition wetting agents and/or emulsifying agents such as sulfates of long chain alcohols containing from 12 to 18 carbon atoms, sulfonated amide and ester derivatives, sulfonated aromatic and mixed alkyl-aryl sulfonate derivatives, esters of fatty acids such as the ricinoleic acid ester of sorbitol, petroleum sulfonates of $C_{10}$ to $C_{20}$ chain length, and the like. Other liquid carriers which are particularly suitable for the compounds of this invention include the perhalogenated solvents such as trichlorofluoromethane, dichlorodifluoromethane and chlorotrifluoromethane, and other Aerosol type solvents.

The invention is further illustrated, but not limited, by the following examples. Parts are by weight unless otherwise specified.

EXAMPLE 1

*N,N'-dimethyl-N,N'-dicarboxymethyl thiuram disulfide*

A mixture of 300 parts of 10% aqueous sodium N-methyl glycine solution and 12 parts of sodium hydroxide is stirred at 10–15° C. while 22.8 parts of carbon disulfide is added gradually. The mixture is stirred at 10–20° C. until the reaction is complete. Twenty-two parts of sodium nitrite and 20 parts of methyl alcohol are then added and the mixture is stirred at 0–5° C. while there is added gradually a mixture of 105 parts of concentrated hydrochloric acid and 500 parts of water. The precipitated white product is isolated by filtration and washing with a small quantity of water, and is obtained in excellent yield. It melts at 130° C. with decomposition. An aqueous dispersion of the compound gives a 100% kill of the spores of *Alterneria solania* and *Sclerotina fructicola* at a concentration of 0.001%.

EXAMPLE 2

*N,N'-diethyl-N,N'-dicarboxymethyl thiuram disulfide*

A solution of 62.5 parts of sodium N-ethyl glycinate in 388 parts of water is stirred while 20 parts of sodium hydroxide is added. The solution is cooled to 0–5° C. and stirred at this temperature while 38 parts of carbon disulfide is added gradually. The mixture is then stirred at 0–5° C. until the reaction is substantially complete. Thirty-six parts of sodium nitrite and 32 parts of methanol are added. One-hundred fifteen parts of concentrated hydrochloric acid is then added gradually while the mixture is kept below 5° C. Sufficient acid is added to make the mixture strongly acid. The precipitated product forms a sticky amorphous mass which is crystallized by dissolving in ether, drying the solution with sodium sulfate and evaporating the solvent. The white crystalline product melts at 108° C. with decomposition. An aqueous dispersion of the compound gives a 100% kill of the spores of *Alterneria solania* and *Sclerotina fructicola* at a concentration of 0.01%.

EXAMPLE 3

*N,N'-diallyl-N,N'-dicarboxymethyl thiuram disulfide*

A solution of 68.7 parts of sodium N-allyl glycinate and 20 parts of sodium hydroxide in 250 parts of water is cooled to 0–5° C. This temperature is maintained while 38 parts of carbon disulfide is gradually added with stirring. The mixture is then stirred at the same temperature until the reaction is substantially complete. Thirty-six parts of sodium nitrite and 32 parts of methanol are then added; the mixture is kept at 0–5° C. and 168 parts of concentrated hydrochloric acid is added slowly with stirring. The product precipitates as an amorphous mass and is treated with ethanol giving an almost white powder which is stable only at lower temperatures but which can be kept in the form of the sodium salt in aqueous solution.

EXAMPLE 4

*N,N'-diisopropyl-N,N'-dicarboxymethyl thiuram disulfide*

A solution of 70 parts of sodium N-isopropyl glycinate and 20 parts of sodium hydroxide in 250 parts of water is cooled to 0–5° C. To this solution is added gradually with stirring, 38 parts of carbon disulfide. The mixture is stirred at 0–5° C. until the reaction is substantially complete and 36 parts of sodium nitrite and 32 parts of methanol are added. At 0–5° C., the pH of the solution is then brought to 3.5 by the slow addition of concentrated hydrochloric acid. The sticky amorphous mass which forms is removed and washed with water and dried. The free acid decomposes when stored at room temperature for several days. By dissolving the acid in caustic soda solution, a solution of the sodium salt is formed which is stable on storage.

EXAMPLE 5

*N,N'-dibutyl-N,N'-dicarboxymethyl thiuram disulfide*

The procedure of Example 2 is followed except that 76.5 parts of sodium N-butyl glycinate is used in place of the 62.5 parts of sodium N-ethyl glycinate.

EXAMPLE 6

*N-methyl-N'-ethyl-N,N'-dicarboxymethyl thiuram disulfide*

The procedures of Examples 1 and 2 are followed to the stage where the hydrochloric acid is to be added. The reaction mixtures of the two examples are then combined and the total hydrochloric acid for the two examples is added to the combined reaction mixtures. By isolation of the product which precipitates there is obtained the N-methyl-N'-ethyl-N,N'-dicarboxymethyl thiuram disulfide as a mixture with the products of Examples 1 and 2.

EXAMPLE 7

*N-ethyl-N'-allyl-N,N'-dicarboxymethyl thiuram disulfide*

The procedure of Example 2 is followed except that 31.3 parts of sodium N-ethyl glycinate and 34.3 parts of sodium N-allyl glycinate are used in place of the 62.5 parts of sodium N-ethyl glycinate. By isolation of the product, there is obtained the unsymmetrical N-ethyl-N'-allyl-N,N'-dicarboxymethyl thiuram disulfide as a mixture with the products of Examples 2 and 3.

The compounds of the present invention may be readily mixed with other active ingredients such as other fungicides or insecticides, herbicides, hormones, fertilizers, and the like to produce multi-purpose compositions. Such mixtures may be either powder or liquid compositions. The other active ingredients may serve as the carrier or an inert carrier may be employed. Examples of such added active ingredients are arsenates, fluorides, rotenones, di(p-chlorophenyl)-trichloroethane, benzene hexachloride and the like.

While the invention has been described with particular reference to specific embodiments, it is to be understood that it is not to be limited thereto but is to be construed broadly and restricted solely by the scope of the appended claims.

We claim:

1. N,N'-dicarboxymethyl thiuram disulfides of the general formula

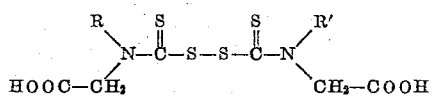

wherein R and R' are acyclic hydrocarbon radicals containing from one to four carbon atoms.

2. N,N'-dimethyl-N,N-dicarboxymethyl thiuram disulfide.

3. N,N'-diethyl-N,N'-dicarboxymethyl thiuram disulfide.

4. N,N'-diallyl-N,N'-dicarboxymethyl thiuram disulfide.

5. N,N'-diisopropyl-N,N'-dicarboxymethyl thiuram disulfide.

6. N-methyl-N'-ethyl-N,N'-dicarboxymethyl thiuram disulfide.

References Cited in the file of this patent

UNITED STATES PATENTS 2,372,895    Harman _____ Apr. 3, 1945

OTHER REFERENCES

Fischer: Ber. Deut Chem., v. 34 (1901), p. 441.